US010309980B2

(12) United States Patent
Fish et al.

(10) Patent No.: US 10,309,980 B2
(45) Date of Patent: *Jun. 4, 2019

(54) FALL DETECTION SYSTEM USING A COMBINATION OF ACCELEROMETER, AUDIO INPUT AND MAGNETOMETER

(71) Applicant: Nortek Security & Control LLC, Carlsbad, CA (US)

(72) Inventors: Ram David Adva Fish, Menlo Park, CA (US); Henry Messenger, Campbell, CA (US); Leonid Baryudin, San Francisco, CA (US); Soroush Salehian Dardashti, Mountain View, CA (US); Evgenia Goldshtein, Madison, NJ (US)

(73) Assignee: Nortek Security & Control LLC, Carlsbad, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/499,625

(22) Filed: Apr. 27, 2017

(65) Prior Publication Data

US 2017/0332223 A1 Nov. 16, 2017

Related U.S. Application Data

(63) Continuation of application No. 14/465,489, filed on Aug. 21, 2014, now Pat. No. 9,648,478, which is a (Continued)

(51) Int. Cl.
*G06F 19/00* (2018.01)
*G01P 1/07* (2006.01)
(Continued)

(52) U.S. Cl.
CPC .......... *G01P 1/07* (2013.01); *H04M 1/72538* (2013.01); *H04W 4/90* (2018.02);
(Continued)

(58) Field of Classification Search
CPC ... G06F 19/00; G06F 17/30867; H04L 67/12; G06Q 50/01
(Continued)

(56) References Cited

U.S. PATENT DOCUMENTS 6,975,941 B1 12/2005 Lau et al.
7,177,397 B2 2/2007 McCalmont et al.
(Continued)

OTHER PUBLICATIONS

"U.S. Appl. No. 13/237,857, Final Office Action dated Dec. 6, 2012", 17 pgs.
(Continued)

*Primary Examiner* — Edward Raymond
(74) *Attorney, Agent, or Firm* — Schwegman Lundberg & Woessner, P.A.

(57) ABSTRACT

A wearable device for detecting a user state is disclosed. The wearable device includes an accelerometer for measuring an acceleration of a user, a magnetometer for measuring magnetic field associated with the user's change of orientation, a microphone for receiving audio, a memory for storing the audio, and at least one processor communicatively connected to the accelerometer, the magnetometer, the microphone, and the memory. The processor is identified to declare a measured acceleration as a suspected user state, and to categorize the suspected user state based on the stored audio as one of an activity of daily life (ADL), a confirmed user state, or an inconclusive event.

20 Claims, 5 Drawing Sheets

Related U.S. Application Data continuation of application No. 13/237,857, filed on Sep. 20, 2011, now Pat. No. 8,843,101.

(60) Provisional application No. 61/516,479, filed on Apr. 4, 2011, provisional application No. 61/516,480, filed on Apr. 4, 2011, provisional application No. 61/404,379, filed on Oct. 4, 2010.

(51) Int. Cl.
  *H04M 1/725* (2006.01)
  *H04W 4/90* (2018.01)

(52) U.S. Cl.
  CPC .... *H04M 2201/40* (2013.01); *H04M 2250/02* (2013.01); *H04M 2250/12* (2013.01)

(58) Field of Classification Search
  USPC .......................... 702/141, 150, 155, 182–185
  See application file for complete search history.

(56) References Cited

U.S. PATENT DOCUMENTS

| | | | |
|---|---|---|---|
| 7,181,192 | B2 | 2/2007 | Panasik et al. |
| 7,238,156 | B1 | 7/2007 | Adamczyk |
| 7,894,849 | B2 | 2/2011 | Kass et al. |
| 8,121,673 | B2 | 2/2012 | Tran |
| 8,183,999 | B1 | 5/2012 | Giallorenzi et al. |
| 8,843,101 | B2 | 9/2014 | Fish et al. |
| 9,174,123 | B2 | 11/2015 | Nasiri et al. |
| 9,462,444 | B1 | 10/2016 | Fish et al. |
| 9,648,478 | B2 | 5/2017 | Fish et al. |
| 2004/0162035 | A1 | 8/2004 | Petersen et al. |
| 2004/0259566 | A1 | 12/2004 | Maanoja |
| 2006/0234727 | A1 | 10/2006 | Ashley, Jr. et al. |
| 2006/0279426 | A1 | 12/2006 | Bonnet et al. |
| 2007/0072583 | A1 | 3/2007 | Barbeau et al. |
| 2008/0133277 | A1 | 6/2008 | Jang et al. |
| 2008/0311878 | A1 | 12/2008 | Martin et al. |
| 2009/0186596 | A1 | 7/2009 | Kaltsukis |
| 2009/0315719 | A1 | 12/2009 | Song et al. |
| 2009/0322513 | A1 | 12/2009 | Hwang et al. |
| 2010/0003953 | A1 | 1/2010 | Ray et al. |
| 2010/0176952 | A1 | 7/2010 | Bajcsy et al. |
| 2010/0217533 | A1 | 8/2010 | Nadkarni et al. |
| 2010/0304705 | A1 | 12/2010 | Hursey |
| 2011/0028118 | A1 | 2/2011 | Thomas |
| 2011/0066383 | A1 | 3/2011 | Jangle et al. |
| 2011/0071880 | A1 | 3/2011 | Spector |
| 2011/0195687 | A1 | 8/2011 | Das et al. |
| 2011/0199216 | A1 | 8/2011 | Flinsenberg et al. |
| 2011/0201299 | A1 | 8/2011 | Kamdar et al. |
| 2012/0007713 | A1 | 1/2012 | Nasiri et al. |
| 2012/0094628 | A1 | 4/2012 | Mader et al. |
| 2012/0095722 | A1 | 4/2012 | Ten Kate et al. |
| 2012/0101411 | A1 | 4/2012 | Hausdorff et al. |
| 2012/0101770 | A1 | 4/2012 | Grabiner et al. |
| 2012/0116559 | A1* | 5/2012 | Davis ............... G06F 3/002 700/94 |
| 2012/0154633 | A1* | 6/2012 | Rodriguez ........ H04M 1/72569 348/231.99 |
| 2014/0365164 | A1 | 12/2014 | Fish et al. |

OTHER PUBLICATIONS

"U.S. Appl. No. 13/237,857, Non-Final Office Action dated Mar. 26, 2013", 17 pgs.
"U.S. Appl. No. 13/237,857, Non-Final Office Action dated Jun. 15, 2012", 17 pgs.
"U.S. Appl. No. 13/237,857, Non-Final Office Action dated Sep. 17, 2013", 16 pgs.
"U.S. Appl. No. 13/237,857, Notice of Allowance dated May 20, 2014", 12 pgs.
"U.S. Appl. No. 13/237,857, Response filed Jan. 17, 2014 to Non-Final Office Action dated Sep. 17, 2013", 10 pgs.
"U.S. Appl. No. 13/237,857, Response filed Mar. 6, 2013 to Final Office Action dated Dec. 6, 2012", 14 pgs.
"U.S. Appl. No. 13/237,857, Response filed Jun. 26, 2013 to Non-Final Office Action dated Mar. 26, 2013", 12 pgs.
"U.S. Appl. No. 13/237,857, Response filed Sep. 17, 2012 to Non-Final Office Action dated Jun. 15, 2012", 12 pgs.
"U.S. Appl. No. 13/237,879, Advisory Action dated Aug. 3, 2015", 3 pgs.
"U.S. Appl. No. 13/237,879, Corrected Notice of Allowance dated Jul. 18, 2016", 4 pgs.
"U.S. Appl. No. 13/237,879, Examiner Interview Summary dated Apr. 22, 2014", 3 pgs.
"U.S. Appl. No. 13/237,879, Examiner Interview Summary dated Aug. 6, 2014", 3 pgs.
"U.S. Appl. No. 13/237,879, Examiner Interview Summary dated Dec. 23, 2014", 3 pgs.
"U.S. Appl. No. 13/237,879, Final Office Action dated May 13, 2015", 19 pgs.
"U.S. Appl. No. 13/237,879, Final Office Action dated Jun. 16, 2014", 15 pgs.
"U.S. Appl. No. 13/237,879, Final Office Action dated Sep. 23, 2013", 14 pgs.
"U.S. Appl. No. 13/237,879, Final Office Action dated Nov. 7, 2012", 14 pgs.
"U.S. Appl. No. 13/237,879, Non Final Office Action dated Jan. 29, 2014", 14 pgs.
"U.S. Appl. No. 13/237,879, Non Final Office Action dated Mar. 26, 2013", 13 pgs.
"U.S. Appl. No. 13/237,879, Non Final Office Action dated May 18, 2012", 14 pgs.
"U.S. Appl. No. 13/237,879, Non Final Office Action dated Aug. 24, 2015", 18 pgs.
"U.S. Appl. No. 13/237,879, Non Final Office Action dated Sep. 25, 2014", 17 pgs.
"U.S. Appl. No. 13/237,879, Notice of Allowance dated May 20, 2016", 17 pgs.
"U.S. Appl. No. 13/237,879, Response filed Jan. 25, 2016 to Non Final Office Action dated Aug. 24, 2015", 14 pgs.
"U.S. Appl. No. 13/237,879, Response filed Feb. 7, 2013 to Final Office Action dated Nov. 7, 2012", 11 pgs.
"U.S. Appl. No. 13/237,879, Response filed Apr. 29, 2014 to Non Final Office Action dated Jan. 29, 2014", 8 pgs.
"U.S. Appl. No. 13/237,879, Response filed Jun. 26, 2013 to Non Final Office Action dated Mar. 26, 2013", 11 pgs.
"U.S. Appl. No. 13/237,879, Response filed Jul. 13, 2015 to Final Office Action dated May 13, 2015", 9 pgs.
"U.S. Appl. No. 13/237,879, Response filed Aug. 12, 2015 to Final Office Action dated May 13, 2015", 9 pgs.
"U.S. Appl. No. 13/237,879, Response filed Aug. 20, 2012 to Non Final Office Action dated May 18, 2012", 10 pgs.
"U.S. Appl. No. 13/237,879, Response filed Sep. 9, 2014 to Final Office Action dated Jun. 16, 2014", 8 pgs.
"U.S. Appl. No. 13/237,879, Response filed Dec. 18, 2014 to Final Office Action dated Sep. 23, 2013", 10 pgs.
"U.S. Appl. No. 13/237,879, Response filed Dec. 23, 2014 to Non Final Office Action dated Sep. 25, 2014", 8 pgs.
"U.S. Appl. No. 14/465,489, Non Final Office Action dated Aug. 26, 2016", 6 pgs.
"U.S. Appl. No. 14/465,489, Notice of Allowance dated Jan. 4, 2017", 6 pgs.
"U.S. Appl. No. 14/465,489, Preliminary Amendment filed Sep. 25, 2014", 6 pgs.
"U.S. Appl. No. 14/465,489, Response filed Nov. 28, 2016 to Non Final Office Action dated Aug. 26, 2016", 11 pgs.
Li, Qiang, "Accurate, Fast Fall Detection Using Gyroscopes and Accelerometer-Derived Posture Information", *Sixth International Workshop on Wearable and Implantable Body Sensor Networks, BSN 2009*, (2009); 138-143.

* cited by examiner

FALL DETECTION SYSTEM USING A COMBINATION OF ACCELEROMETER, AUDIO INPUT AND MAGNETOMETER

CROSS-REFERENCE TO RELATED APPLICATION

This application is a continuation of U.S. patent application Ser. No. 14/465,489, filed on Aug. 21, 2014, which is a continuation of U.S. patent application Ser. No. 13/237,857, filed on Sep. 20, 2011, which claims the benefit of U.S. Provisional Patent App. No. 61/516,479, filed Apr. 4, 2011, U.S. Provisional Patent App. No. 61/516,480, filed Apr. 4, 2011, and U.S. Provisional Patent App. No. 61/404,379, filed Oct. 4, 2010, which are all hereby incorporated by reference in their entirety.

TECHNICAL FIELD

Embodiments of the present invention relate generally to health care-based monitoring systems, and more particularly, to a system and method for detecting a predefined state of a user.

BACKGROUND

For certain age groups, such as the elderly, or people that engage in certain dangerous activities, such as firefighters and soldiers, a fall can adversely affect health. As a result, many fall detection systems and devices have been developed. Many such systems and devices employ accelerometers that measure sudden changes in acceleration that may indicate a fall, such as rapid changes in acceleration followed by no movement (i.e., lying on the floor). Such methods have difficulty distinguishing falls from activities of daily living (ADL). This makes it difficult to distinguish real falls from certain fall-like activities such as sitting or lying down quickly, resulting in many false positives. Body orientation is also used as a means of detecting falls, but it is not very useful when the ending position is not horizontal, e.g., falls happening on stairs.

U.S. Patent Application Publication No. US 2006/0279426 A1 (hereinafter "the '426 publication") describes a device which includes a user-worn accelerometer and magnetometer that assumes a person is in a standing position. A fall event is declared when a significant and rapid acceleration signal coincides with a shift in ambient magnetic fields between two levels. However, the device of the '426 publication requires complicated algorithms to remove false positives and negatives, and is therefore computationally expensive, power hungry, and produces uncertain results.

A paper by Q. Li, et al., titled, "*Accurate, Fast Fall Detection Using Gyroscopes and Accelerometer-Derived Posture Information*," College of William and Mary, (hereinafter "Li et al.") describes a system and method for detecting falls that employs gyroscopes in addition to accelerometers. In Li et al., human activities are divided into two categories: static postures and dynamic transitions. By using two tri-axial accelerometers at separate body locations, the system can recognize four kinds of static postures: standing, bending, sitting, and lying. Motions between these static postures are considered to be dynamic transitions. Linear acceleration and angular velocity are measured to determine whether motion transitions are intentional. If the transition before a lying posture is not intentional, a fall event is declared.

The system of Li et al. requires sensors to be distributed in several locations, which is not convenient for a user nor is it practical to implement when the user is in an unfamiliar environment. Moreover, continuous monitoring with gyroscopes requires a large amount of power.

Another conventional solution includes a stationary device that bases fall decisions on measurements of floor vibrations and audio analysis. To enable a user to have an audio conversation using a mobile version of the aforementioned stationary device, two microphones are employed to remove background noise. This solution arbitrarily designates one microphone to be the primary microphone for measurements and the other microphone is employed for detecting the background noise. This renders it difficult to distinguish between human activity and other sources of noise vibration, such as an object falling off a table.

BRIEF DESCRIPTION OF THE DRAWINGS

Embodiments of the present invention will be more readily understood from the detailed description of exemplary embodiments presented below considered in conjunction with the attached drawings in which like reference numerals refer to similar elements and in which.

DETAILED DESCRIPTION

Figure 1:
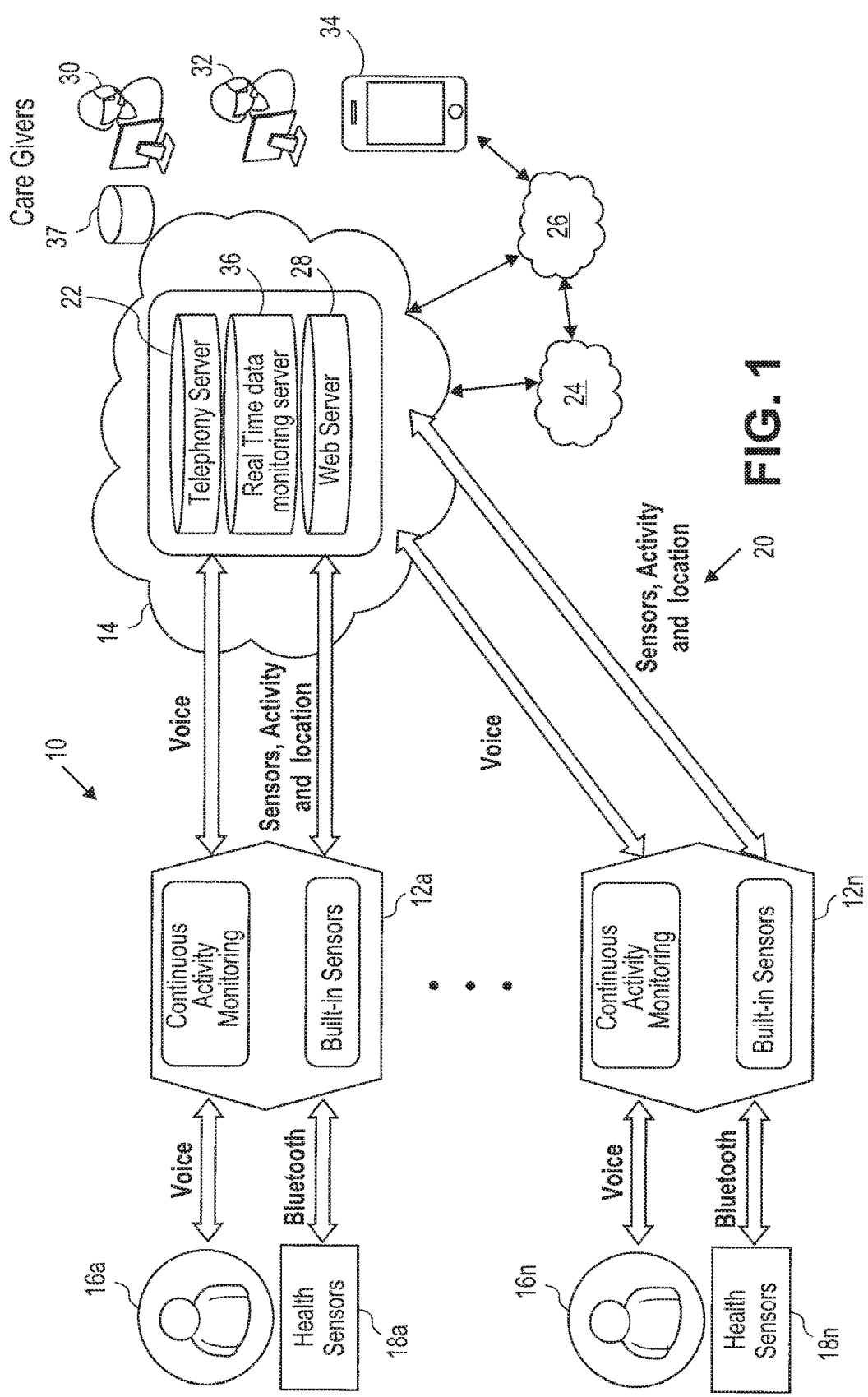
FIG. 1 depicts an exemplary system for detecting a fall, according to an embodiment of the present invention.

Embodiments of the invention provide a wearable device configured to detect a predefined state of a user. The predefined state may include a user physical state (e.g., a user fall inside or outside a building, a user fall from a bicycle, a car incident involving a user, etc.) or an emotional state (e.g., a user screaming, a user crying, etc.). The wearable device may include an accelerometer for measuring an acceleration of the user, a magnetometer for measuring a magnetic field associated with the user's change of orientation, a microphone for receiving audio, a memory for storing the audio, and a processing device ("processor") communicatively connected to the accelerometer, the magnetometer, the microphone, and the memory. The processor periodically receives measurements of acceleration and/or magnetic field of the user and stores the audio captured by the microphone in the memory. The processor is configured to declare a measured acceleration and/or a calculated user orientation change based on the measured magnetic field as a suspected user state. The processor may then categorize the suspected user state based on the stored audio as an activity of daily life (ADL), a confirmed predefined user state, or an inconclusive event.

In one embodiment, the wearable device further comprises a gyroscope communicatively connected to the processor, where the processor is configured to calculate a change of orientation of the user from the gyroscope, the magnetometer, and accelerometer that is more accurate than a change of orientation calculated from the magnetometer and accelerometer alone. The wearable device may further comprise a speaker and a cellular transceiver each communicatively connected to the processor, where the processor is configured to employ the speaker, the microphone, and the cellular transceiver to receive a notification and an optional confirmation from a voice conversation with a call center or the user.

In one embodiment, the processor is further configured to extract at least one feature from the stored audio and the measured acceleration and/or magnetic field. The feature may be a time domain, frequency domain or an ter-signal dynamic property. The inter-signal dynamic property may be based on relationships between audio energy and physical movement. The inter-signal dynamic property may be elapsed time between acceleration and audio peaks or between acceleration and rotation rate peaks.

In one embodiment, the wearable device further comprises a cellular transceiver configured to communicate with a cloud computing system, where the processor is operable to employ the cellular transceiver to transmit the stored audio and the measured acceleration and/or magnetic field and/or the calculated change of orientation to the cloud computing system and receive a re-confirmation or change of classification from the cloud computing system based on the stored audio and the measured acceleration and/or magnetic field and/or the calculated change of orientation. The re-confirmation or change of classification may be based on output of a trained classifier operable to render a decision based on the stored audio and/or the measured acceleration and/or magnetic field and/or the calculated change of orientation. The trained classifier may be a combination of a Gaussian Mixture model (GMM) for classifying falls and a GMM for classifying ADLs.

FIG. 1 depicts an exemplary system 10 for detecting a predefined user state, according to an embodiment of the present invention. The system 10 includes wearable devices 12a-12n communicatively connected to a distributed cloud computing system 14. A wearable device 12 may be a small-size computing device that can be wearable as a watch, a pendant, a ring, a pager, or the like, and can be held in multiple orientations.

In one embodiment, each of the wearable devices 12a-12n is operable to communicate with a corresponding one of users 16a-16n (e.g., via a microphone, speaker, and voice recognition software), external health sensors 18a-18n (e.g., an EKG, blood pressure device, weight scale, glucometer) via, for example, a short-range OTA transmission method (e.g., BlueTooth), and the distributed cloud computing system 14 via, for example, a long range OTA transmission method (e.g., over a 3G or 4G cellular transmission network 20). Each wearable device 12 is configured to detect predefined states of a user. The predefined states may include a user physical state (e.g., a user fall inside or outside a building, a user fall from a bicycle, a car incident involving a user, a user taking a shower, etc.) or an emotional state (e.g., a user screaming, a user crying, etc.). As will be discussed in more detail below, the wearable device 12 may include multiple sensors for detecting predefined user states. For example, the wearable user device 12 may include an accelerometer for measuring an acceleration of the user, a magnetometer for measuring a magnetic field associated with the user's change of orientation, and a microphone for receiving audio. Based on data received from the above sensors, the wearable device 12 may identify a suspected user state, and then categorize the suspected user state as an activity of daily life, a confirmed predefined user state, or an inconclusive event. The wearable user device 12 may then communicate with the distributed cloud computing system 14 to obtain a re-confirmation or change of classification from the distributed cloud computing system 14.

Cloud computing provides computation, software, data access, and storage services that do not require end-user knowledge of the physical location and configuration of the system that delivers the services. The term "cloud" refers to a plurality of computational services (e.g., servers) connected by a computer network.

The distributed cloud computing system 14 may include one or more computers configured as a telephony server 22 communicatively connected to the wearable devices 12a-12n, the Internet 24, and one or more cellular communication networks 20, including, for example, the public circuit-switched telephone network (PSTN) 26. The distributed cloud computing system 14 may further include one or more computers configured as a Web server 28 communicatively connected to the Internet 24 for permitting each of the users 16a-16n to communicate with a call center 30, first-to-answer systems 32, and care givers and/or family 34. The distributed cloud computing system 14 may further include one or more computers configured as a real-time data monitoring and computation server 36 communicatively connected to the wearable devices 12a-12n for receiving measurement data, for processing measurement data to draw conclusions concerning a potential predefined user state, for transmitting user state confirmation results and other commands back to the to the wearable devices 12a-12n, and for storing and retrieving present and past historical predefined user state feature data from a database 37 which may be employed in the user state confirmation process, and in retraining further optimized and individualized classifiers that can in turn be transmitted to the wearable device 12a-12n.

Figure 2:
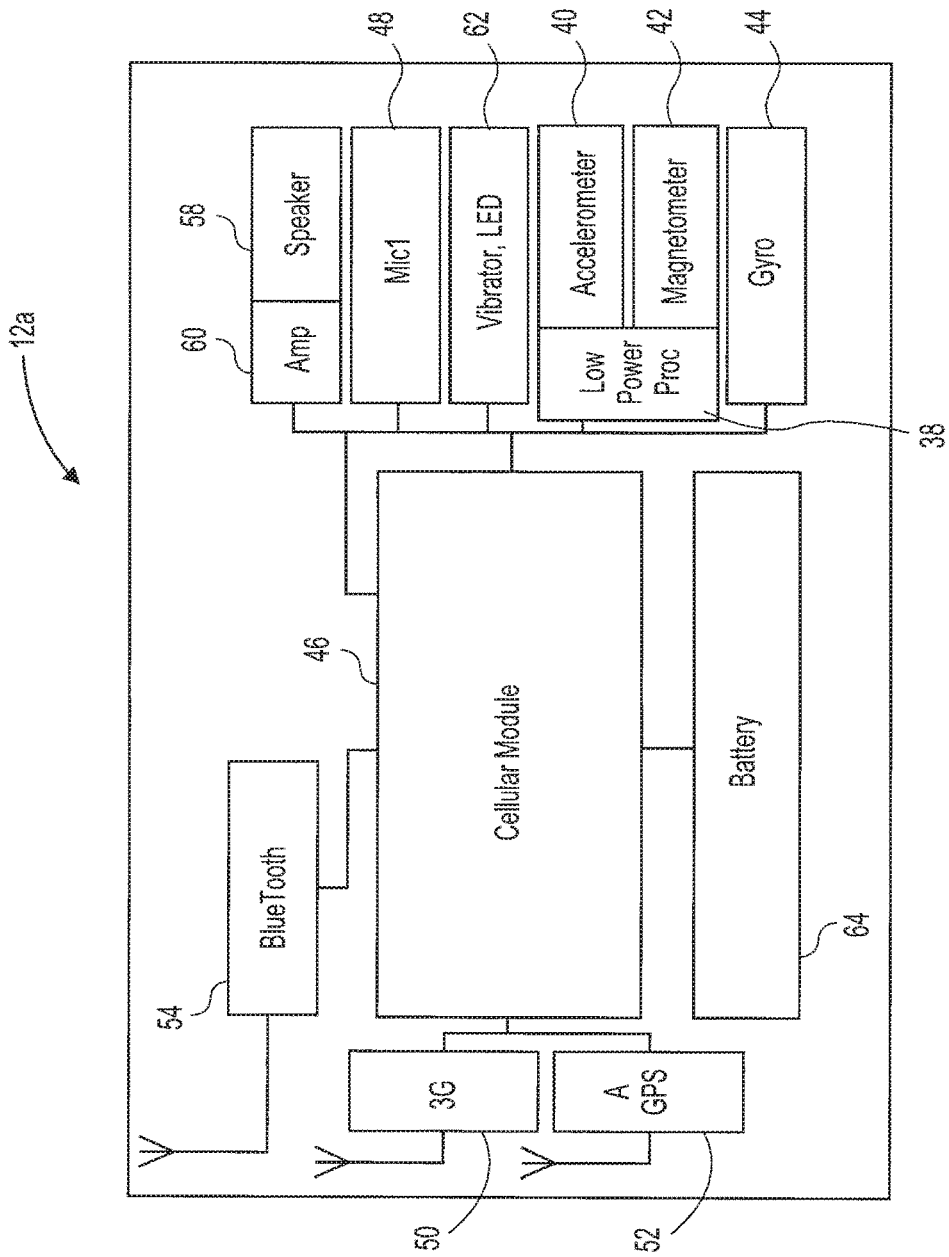
FIG. 2 is a block diagram of the components of the wearable device employed in the system of FIG. 1, according to an embodiment of the present invention.

FIG. 2 is a block diagram of the components of an exemplary wearable device 12a employed in the system of FIG. 1, according to an embodiment of the present invention. The wearable device 12a may include a low-power processor 38 communicatively connected to an accelerometer 40 (e.g., a 3-axis accelerometer) for detecting acceleration events (e.g., high, low, positive, negative, oscillating, etc.), a magnetometer 42 (preferably a 3-axis magnetometer), for assessing a magnetic field of the wearable device 12a, and an optional gyroscope 44 for providing a more precise short term determination of orientation of the wearable device 12a. The low-power processor 38 is configured to receive continuous or near-continuous real-time measurement data from the accelerometer 40, the magnetometer 42, and the optional gyroscope 44 for rendering tentative decisions concerning predefined user states. By utilizing the above components, the wearable device 12 is able to render these decisions in relatively low-computationally expensive, low-powered manner and minimize false positive and false negative errors. A cellular module 46, such as the 3G IEM 6270 manufactured by QCOM, includes a high-computationally-powered microprocessor element and internal memory that are adapted to receive the suspected fall events from the low-power processor 38 and to further correlate orientation data received from the optional gyroscope 44 with digitized audio data received from one or more microphones 48 (preferably, but not limited to, a micro-electro-mechanical systems-based (MEMS) microphone(s)). The audio data may include the type, number, and frequency of sounds originating from the user's voice, the user's body, and the environment.

The cellular module 46 is also configured to receive commands from and transmit data to the distributed cloud computing system 14 via a 3G or 4G transceiver 50 over the cellular transmission network 20. The cellular module 46 is further configured to communicate with and receive position data from an a GPS receiver 52, and to receive measurements from the external health sensors 18a-18n via a short-range Bluetooth transceiver 54. In addition to recording audio data for event analysis, the cellular module 46 is further configured to permit direct voice communication between the user 16a and the call center 30, first-to-answer systems 32, or care givers and/or family 34 via a built-in speaker 58 and an amplifier 60. The cellular module 46 may receive operate a plurality of input and output indicators 62 (e.g., a plurality of mechanical and touch switches (not shown), a vibrator, LEDs, etc.). The wearable device 12a also includes an on-board battery power module 64. The wearable device 12a may also include empty expansion slots (not shown) to collect readings from other internal sensors (i.e., an inertial measurement unit), for example, a pressure sensor (for measuring air pressure, i.e., attitude) or heart rate, blood perfusion sensor, etc.

Figure 3A:
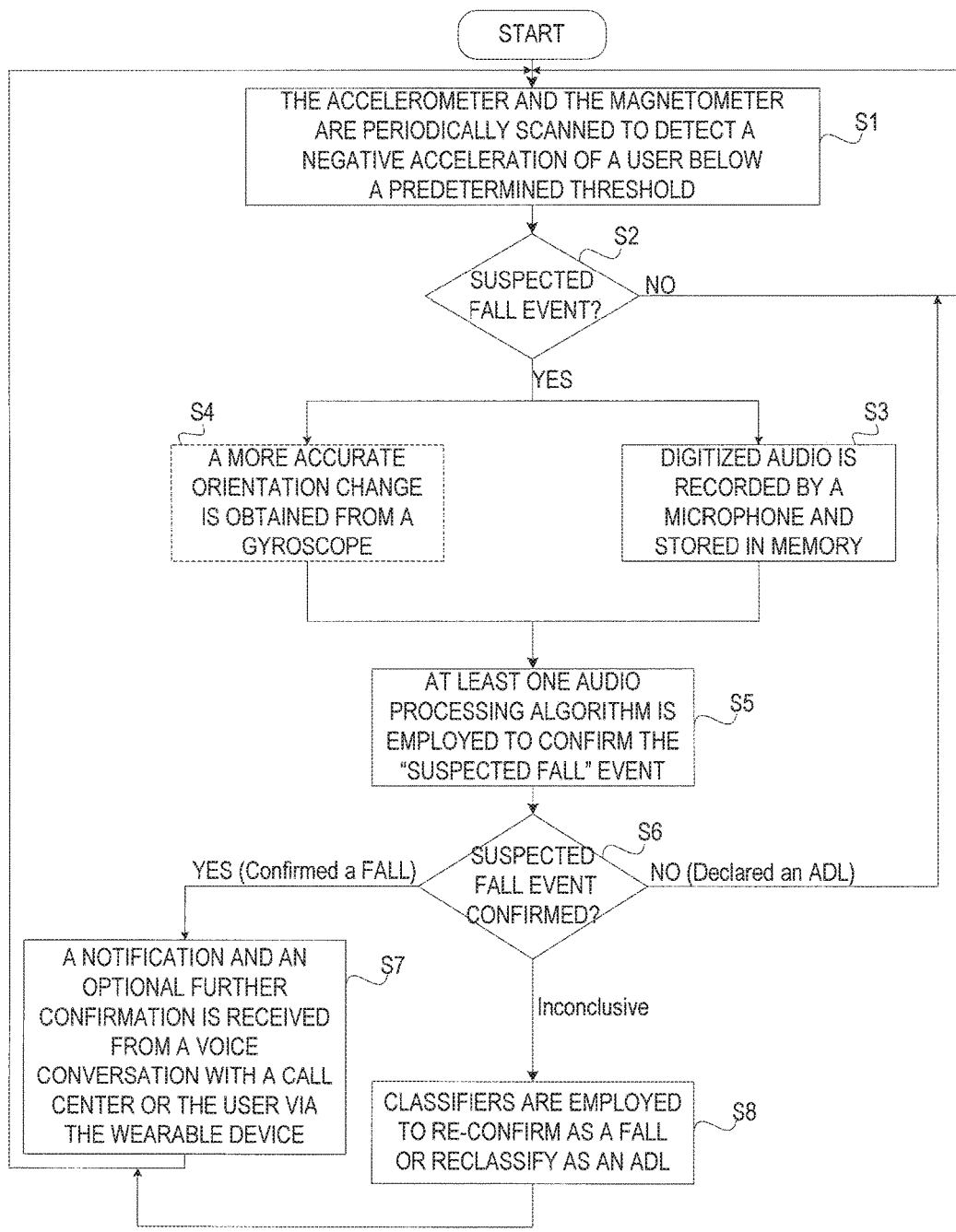
FIG. 3A is a flow diagram of one embodiment of a method for detecting a fall using the wearable device of FIG. 2.

FIG. 3A is a flow diagram of one embodiment of a method for detecting a fall. The method is performed by processing logic that may comprise hardware (circuitry, dedicated logic, etc.), software (such as is run on a general purpose computer system or a dedicated machine), or a combination of both. In one embodiment, the method is performed by a user device (e.g., wearable device 102 of FIG. 1).

Referring to FIGS. 1, 2 and 3A, at block S1, the low-power processor 38 periodically scans the accelerometer 40. If the low-power processor 38 detects at block S2 a large negative acceleration of a user (i.e., an acceleration below a certain threshold, which can be individually optimized for the user, and controlled by the distributed cloud computing system 14 or the processor 38), then a "suspected fall" event is declared by the low-power processor 38; otherwise, the method returns to block S1. If a "suspected fall" is declared, control may be transferred to the more computationally-intensive high-power processor element within the cellular module 46. At block S3, the cellular module 46 records and stores digitized audio received from the microphone(s) 48 in its internal memory (not shown) for a predetermined amount of time. The audio data recorded may begin either from the moment the suspected fall is initially detected or from a few seconds before the beginning of the suspected fall if the audio data was stored in a continuous buffer in an internal memory of the cellular module 46. Optionally at block S4, the cellular module 48 may activate the gyroscope 44 to obtain (either directly or via the low-power processor 38) samples of more accurate orientation change data.

In an embodiment, the gyroscope 44 is not optional, but automatically activated b the cellular module 48 to obtain samples of more accurate orientation change data. The gyroscope 44 may be used to filter data received from the magnetometer 42 and accelerometer 40 to achieve a more accurate orientation calculation to confirm or reject "suspected fall" events based on a predetermined minimum change in orientation.

At block S5, the cellular module 48 employs at least one audio processing algorithm to confirm the "suspected fall" event. Exemplary audio processing algorithms may include, but are not limited to, an opt-out mechanism in which specific sound patterns are used to assess the "suspected fall" as normal (e.g., complete silence, talking, walking, etc., collectively "activities of daily life" or ADL events), or an opt-in mechanism in which the cellular module 48 detects specific sounds such as a "bang" or a "scream" to confirm that the fall has happened. When an opt-in mechanism is employed, specific features of the audio data may be extracted, which may be based on relationships between audio energy and physical movement of the user 16a (via the wearable device 12a). An exemplary relationship may include, but is not limited to, elapsed time between acceleration and audio energy peaks. Exemplary features may include, but are not limited to, time domain properties such as vertical velocity, rotation angle, and vertical distance peaks; frequency domain properties such as spectral envelope, dominant frequency, and periodicity measurement; signal dynamics properties in both time and frequency domain, such as changes in signal amplitude and frequency content over time; and inter-signals dynamic properties such as elapsed time between acceleration and audio peaks or acceleration and rotation rate peaks.

These features may be directly extracted from measurement data by the cellular module 48 or may be passed on to the real-time data monitoring and computation server 36 of the distributed cloud computing system 14 via the 3G/4G transceiver 50 and the cellular transmission network 20. The real-time data monitoring and computation server 36 may then extract the features from the measurement data and may then return the extracted features to the cellular module 48 for classification or directly perform the classification and return classification results (i.e., a confirmed fall event or an ADL) to the cellular module 48.

Additionally, other sensors may be employed in the decision process, which may include data from the health sensors 18a-18n received over the short-range BlueTooth transceiver 54 and the a GPS receiver 52. The information of some or all of the sensors may be used together to validate the suspected fall. Different weighting mechanisms may be applied dynamically (e.g., using a neural net algorithm). An exemplary table of weights versus classification is shown in Table 1 as follows:

TABLE 1

| Accelerometer | Gyroscope | Voice | Result |
| --- | --- | --- | --- |
| 60% | No | 70% | No |
| 60% | Yes | 50% | Yes |
| 50% | Yes | 40% | Re-analyze Accelerometer and voice data |
| 70% | No | 20% | No |

If, at block S6, a suspected fall is classified as a "confirmed fall", then at block S7, the confirmed fall is reported to the call center 30, the first-to-answer systems 32, or care givers and/or family 34, who may further assess the "confirmed" fall by listening in or replaying audio data returned on command to/from the wearable device 12a via the Web server 28. Conversations with the user 16a may be employed to identify a false positive or a false negative.

The decision table (i.e., Table 1) may be dynamically adaptive in the sense that the system 10 may "learn" from past incidents of confirmed activities. The measurement data from past confirmed activities may be stored on the wearable device 12a or in the database 37 associated with the data monitoring and computation server 36 and later used if false classification was confirmed through the call center 30.

If, at block S6, the classification of the suspected fall is inconclusive, then at block S8, stronger algorithms may be applied based on sensor data transmitted to the real-time data monitoring and computation server 36 of the distributed cloud computing system 14 (as a result, power may be conserved in the wearable device 12a by restricting the low-power processor 38 and/or the cellular module 48 to relatively simple initial assessment algorithms). A person skilled in the art would appreciate that the computational power of embedded processors may continue to rapidly improve over time and likewise the cost of such devices may decrease over time such that the complete method described in FIG. 3A may be executable on a single embedded processor incorporated within the wearable device 12a.

Returning to block S8, the decision whether to send raw measurement data or extracted features to the data monitoring and computation server 36 may be made dynamically within the wearable device 12a or may be made by the data monitoring and computation server 36 (i.e., raw data may be stored on the wearable device 12a for period of time). If the data monitoring and computation server 36 sends a command to the wearable device 12a to transmit raw measurements, the data monitoring and computation server 36 may extract desired features directly from the raw measurements. The data monitoring and computation server 36 may employ on-demand cloud computing to exploit massive parallelism and GPU computing to return a more accurate classification in real-time to the wearable device 12a.

Once the data monitoring and computation server 36 receives or computes features, a re-confirmation of a suspected fall or a re-classification of the activity as an ADL may takes place determining whether a "suspected fall" is a confirmed fall, stumble, or normal ADL, and if so, what kind of fall or ADL, and how severe). The re-confirmation/re-classification may be fully automatic, or in some cases, decided by a human operator based on the computed features or based on a conversation with the user 16a via execution of a voice-to-text algorithm, the speaker 58, and the microphone(s) 48 on the wearable device 12a, and/or via an interactive voice response system (IVR) integrated with the Web server 28.

The stronger algorithms that may be employed include, but are not limited to, the training and testing of classifiers. A person skilled in the art would recognize that any suitable trained classifier may be employed, including, but not limited to, a Gaussian mixture model (GMM) or a support vector machines (SVM), as is known in the art. In one embodiment, two GMMs are employed: one trained on positive samples indicative of a fall and one trained on negative samples indicative of an ADL.

Figure 3B:
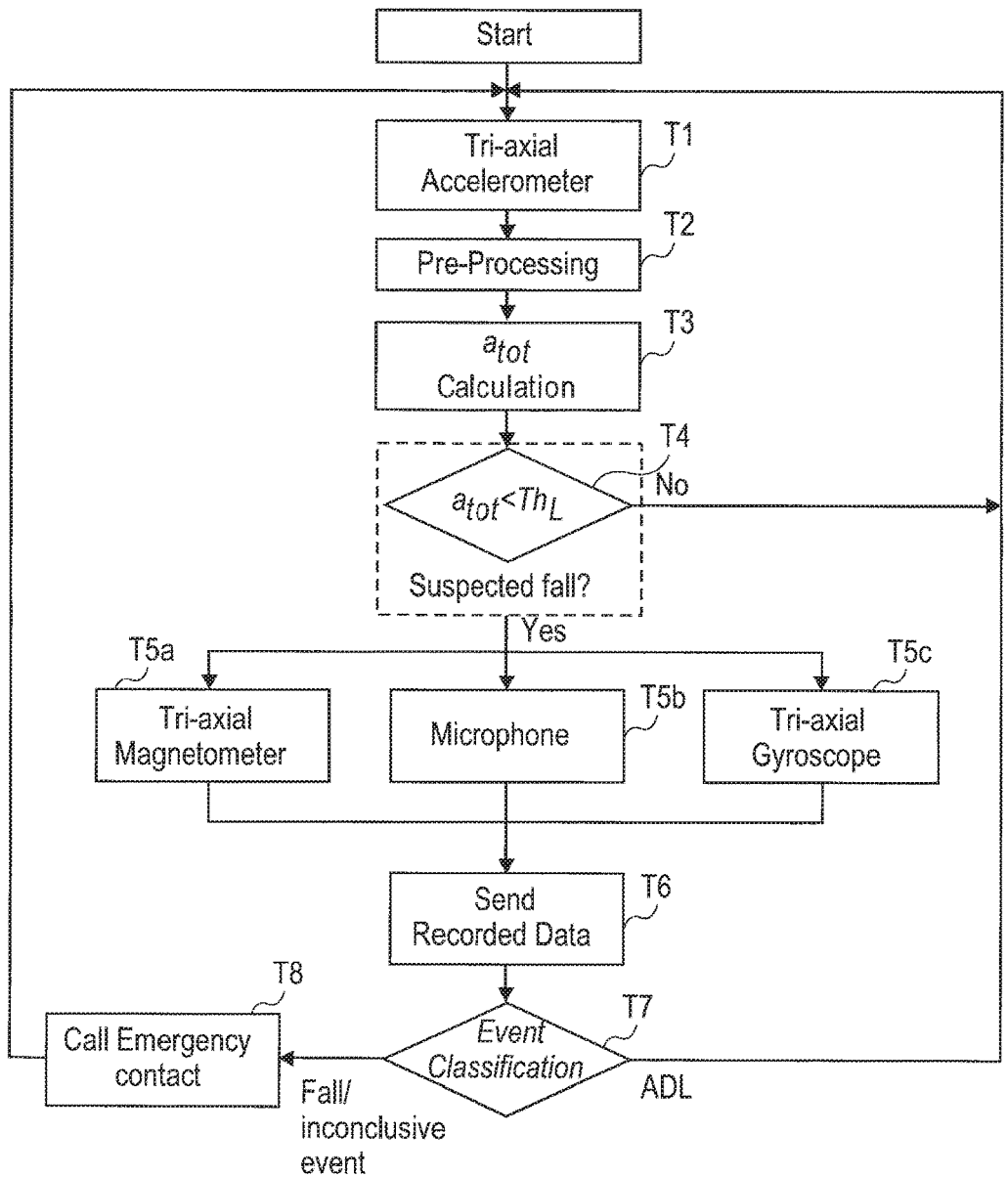
FIG. 3B is a flow diagram of another embodiment of a method for detecting a fall using the wearable device of FIG. 2.

FIG. 3B is a flow diagram of another embodiment of a method for detecting a fall. Referring to FIGS. 1, 2 and 3B, at block T1, the low-power processor 38 periodically scans the accelerometer 40 (e.g., a tri-axial accelerometer) to receive acceleration signals, $a_x$, $a_y$, $a_z$, along three axis x, y, and z in a rectangular coordinate system) of the accelerometer 40.

At block T2, the individual acceleration signals, $a_x$, $a_y$, $a_z$, are pre-processed by means of filtering and smoothing methods known in the art. At block T3, the preprocessed acceleration signals are combined into a total acceleration signal, $a_{tot}$ according to Equation 1:

$$a_{tot} = \sqrt{(a_x)^2 + (a_y)^2 + (a_z)^2} \quad (1)$$

If the low-power processor 38 detects at block T4 a low acceleration of a user (i.e., a value of final acceleration $a_{tot}$, below an adaptable threshold $Th_L$), then a "suspected fall" event is declared by the low-power processor 38; otherwise, the method returns to block T1.

If a "suspected fall" is declared, control may be transferred to the more computationally-intensive high-power processor element within the cellular module 46 where, at blocks T5a, T5b, T5c, the cellular module 48 may activate the magnetometer 42, the microphone(s) 48 (i.e., cellular module 48 records and stores digitized audio received from the microphone(s) 48 in its internal memory (not shown)), and the gyroscope 44 (i.e., to obtain (either directly or via the low-power processor 38) samples of more accurate orientation change data), for a predetermined amount of time.

At block T6, the raw measurement data received from the accelerometer 40, the magnetometer 42, the microphone(s) 48, and the gyroscope 44 by the cellular module 48 are transmitted to the real-time data monitoring and computation server 36 of the distributed cloud computing system 14 via the 3G/4G transceiver 50 and the cellular transmission network 20. At block T7, the data monitoring and computation server 36 may extract desired features directly from the raw measurements. The data monitoring and computation server 36 may employ on-demand cloud computing to exploit massive parallelism and GPU computing to return a more accurate classification in real-time to the wearable device 12a.

Once the data monitoring and computation server 36 computes features, a re-confirmation of a suspected fall, a re-classification of the activity as an ADL, or an inconclusive event may takes place (i.e., determining whether a "suspected fall" is a confirmed fall, stumble, or normal ADL, and if so, what kind of fall or ADL, and how severe). The re-confirmation/re-classification may be fully automatic, or in some cases, decided by a human operator based on the computed features or based on a conversation with the user 16a via execution of a voice-to-text algorithm, the speaker 58, and the microphone(s) 48 on the wearable device 12a, and/or via an interactive voice response system (IVR) integrated with the Web server 28.

As described hereinabove, trained and tested classifiers may be employed in the re-confirmation process, which may include, but are not limited to, a Gaussian mixture model (GMM) or a support vector machines (SVM), as is known in the art. In one embodiment, two GMMs are employed: one trained on positive samples indicative of a fall and one trained on negative samples indicative of an ADL.

If, at block T7, a suspected fall is classified as a confirmed fall/inconclusive event, then at block T8, the confirmed fall/inconclusive event is reported to the call center 30, the first-to-answer systems 32, or care givers and/or family 34, who may further assess the "confirmed" fall by listening in or replaying audio data returned on command to/from the wearable device 12a via the Web server 28. Conversations with the user 16a may be employed to identify a false positive or a false negative. If, at block T8, a suspected fall is classified as an ADL, then processing returns to block T1.

Figure 4:
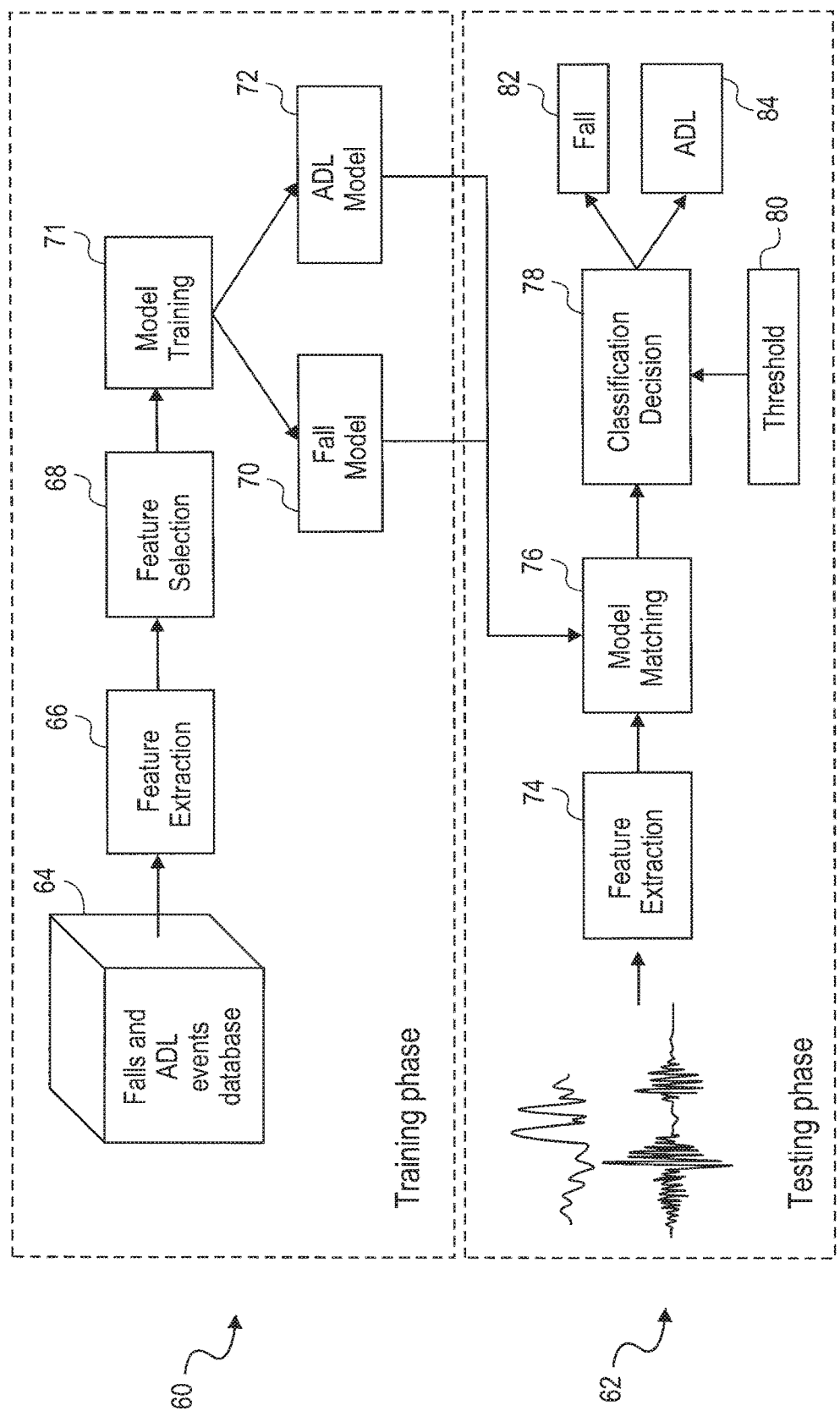
FIG. 4 is a block diagram of a representative classification method that may be employed to train and operate one or more classifiers for re-confirming a suspected fall, according to an embodiment of the present invention.

FIG. 4 is a block diagram of a representative classification method that may be employed to train and operate one or more classifiers, according to an embodiment of the present invention. The method comprises two phases: a training stage 60 and a testing stage 62. The purpose of the training stage 60 is to train a model for each group of events: falls 70 and ADLs 72. The input to the training stage 60 is a set of fall and ADL features previously derived from measurement sample data (e.g., from human volunteers) of events from each group. The input measurement samples undergo pre-processing and feature extraction. Then, a feature subset that best differentiates between the groups is selected, and a GMM model for each group is trained. The outputs of the training stage 60 are a set of indices, which represents the selected feature subset and the two GMM models 70, 72.

These outputs are stored in the database 37 associated with the data monitoring and computation server 36.

More particularly, measurement data from prior confirmed fall and ADL events received from either in-use or experimental subjects are received from the plurality of wearable devices 12a-12n (i.e., a form of adapting and system learning built into the system 10) into a portion of the database 37 designated as a fall and ADL events database 64. The data is processed and relevant features are extracted from each event in a feature extraction block 66. Gaussian mixture model (GMM) classifiers are implemented on a subset of a selected features space 68, selected via a sequential forward floating selection (SFFS) algorithm designed to maximize classifier performance. Each class, fall 70 and ADL 72, is represented by a GMM trained using an expectation maximization algorithm 71.

In the testing stage 62, an unknown event is introduced to each of the classifiers 70, 72 (i.e., when a new event is recorded by the wearable device 12a that is considered to be an inconclusive event). The inconclusive event undergoes pre-processing, and the previously selected features are extracted in block 74 and saved as a feature matrix. A score is calculated for the inconclusive event in a model matching phase 76. The classification decision 78 is based on a comparison of the score with a threshold 80 determined during the training phase 60 as either a confirmed fall event 82, an ADL event 84, or an inconclusive event (not shown).

It should be noted that numerous variations of mechanisms discussed above can be used with embodiments of the present invention without loss of generality. For example, a person skilled in the art would also appreciate that the complete method described in FIGS. 3A and 3B may be executed on a single embedded processor incorporated within the wearable device 12a. A person skilled in the art would also appreciate that, in addition to inconclusive events, measurement data and recorded audio and/or extracted features of initially confirmed falls and/or ADLs may be passed on to the trained classifiers 70, 72 for a final decision (i.e., a re-confirmation of a fall or a re-classification as an ADL).

The combination of sensors may be employed to detect predefined user states in various environments and during various activities such as but not limited to: inside a house, while sleeping, while walking or exercising outside the house, while in the shower, etc. The combination of sensors may be used to detect a "shower mode," wherein microphone and speaker levels are automatically adjusted to filter out ambient water noise. This may be achieved by running a simple algorithm on the microphone 48 output to detect that the user 16a is in the shower. When the user 16a is in a "shower mode," the wearable device 12a may employ a different algorithm and decision table to detect possible falls. As another example, the wearable device 12a can differentiate between a fall in the shower and a fall outside the shower. The sensor measurement thresholds employed in the decision table (i.e., Table 1) would provide different results when the user 16a is in "shower mode."

Returning to FIG. 2, the device 12a may also include a main memory (e.g., read-only memory (ROM), flash memory, dynamic random access memory (DRAM) such as synchronous DRAM (SDRAM)), a static memory (e.g., flash memory, static random access memory (SRAM)), and a data storage device, which communicate with each other and the processor 38 via a bus. Processor 38 may represent one or more general-purpose processing devices such as a microprocessor, distributed processing unit, or the like. More particularly, the processor 38 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 38 may also be one or more special-purpose processing devices such as an application specific integrated circuit (ASIC), a field programmable gate array (FPGA), a digital signal processor (DSP), network processor, or the like. The processor 38 is configured to perform the operations and/or functions discussed herein.

The user device 38 may further include a video display unit a liquid crystal display (LCD) or a cathode ray tube (CRT)), an input device (e.g., a keyboard or a touch screen), and a drive unit that may include a computer-readable medium on which is stored one or more sets of instructions embodying any one or more of the methodologies or functions described herein. These instructions may also reside, completely or at least partially, within the main memory and/or within the processor 38 during execution thereof by the user device 12a, the main memory and the processor also constituting computer-readable media.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies discussed herein. The term "computer-readable storage medium" shall accordingly be taken to include, but not be limited to, solid-state memories, optical media, and magnetic media.

In the above description, numerous details are set forth, it will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "categorizing", "receiving", "extracting" air the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus wearable by a user for detecting a user state, comprising:
an accelerometer;
a magnetometer;
a microphone;
memory; and
at least one processor communicatively connected to the accelerometer, the magnetometer, the microphone, and the memory, and configured to:
identify a suspected user state based on an acceleration measured by the accelerometer and a change of orientation measured by the magnetometer;
categorize the suspected user state as one of an activity of daily life (ADL), a confirmed user state indicating that a fall has occurred, and an inconclusive event;
transmit at least one of the measured acceleration and the change of orientation to a cloud computing system; and
receive a re-confirmation or change of classification from the cloud computing system based on the at least one of the measured acceleration and the change of orientation.

2. The apparatus of claim 1, wherein the at least one processor is configured to transmit audio received by the microphone and stored in the memory to the cloud computing system.

3. The apparatus of claim 2, wherein the at least one processor is further configured to extract at least one feature from the stored audio and at least one of the measured acceleration or the measured change of orientation.

4. The apparatus of claim 3, wherein the at least one feature is an inter-signal dynamic property.

5. The apparatus of claim 4, wherein the inter-signal dynamic property is based on relationships between audio energy and physical movement.

6. The apparatus of claim 5, wherein the inter-signal dynamic property is one of elapsed time between acceleration and audio peaks and acceleration and rotation rate peaks.

7. The apparatus of claim 2, wherein the at least one processor is configured to receive the re-confirmation or change of classification from the cloud computing system based on the stored audio and the at least one of the measured acceleration and the change of orientation.

8. The apparatus of claim 7, wherein categorizing the suspected user state based on the stored audio comprises an opt-out mechanism wherein specific sound patterns are used to assess the suspected user state as an ADL.

9. The apparatus of claim 7, wherein categorizing the suspected user state based on the stored audio comprises an opt-in mechanism wherein specific sound are detected and employed to confirm that the fall has occurred.

10. The apparatus of claim 1, further comprising a gyroscope communicatively connected to the at least one processor, wherein the at least one processor is configured to calculate the change of orientation from measurements from one or more of the gyroscope, the magnetometer, and the accelerometer.

11. A computer implemented method performed by an apparatus wearable by a user for detecting a fall of a user, the method comprising:
measuring an acceleration of the user;
measuring a magnetic field associated with the user and calculating an orientation of the user based on the measured magnetic field;
identifying, by a processor, the measured acceleration and the calculated change of orientation of the user as a suspected fall;
categorizing, by the processor, the suspected fall as one of an activity of daily life (ADL), a confirmed fall, and an inconclusive event;
transmitting at least one of the measured acceleration and the calculated change of orientation to a cloud computing system; and
receiving a re-confirmation or change of classification from the cloud computing system based on the at least one of the measured acceleration and the calculated change of orientation.

12. The method of claim 11, further comprising receiving and storing audio and transmitting the audio to the cloud computing system.

13. The method of claim 12, further comprising extracting at least one feature from the stored audio and at least one of the measured acceleration and the calculated change of orientation.

14. The method of claim 13, wherein:
the at least one feature is an inter-signal dynamic property is based on relationships between audio energy and physical movement; and
the inter-signal dynamic property is one of elapsed time between acceleration and audio peaks and acceleration and rotation rate peaks.

15. The method of claim 12, further comprising receiving the re-confirmation or change of classification from the cloud computing system based on the stored audio and the at least one of the measured acceleration and the calculated change of orientation.

16. The method of claim 15, wherein categorizing the suspected fall based on the stored audio comprises an opt-out mechanism wherein specific sound patterns are used to assess the suspected fall as an ADL.

17. The method of claim 15, wherein categorizing the suspected fall based on the stored audio comprises an opt-in mechanism wherein specific sounds characteristics are detected and employed to confirm that a fall has happened.

18. The method of claim 10, further comprising calculating the change of orientation of the user from measurements from a gyroscope, the magnetometer, and the accelerometer.

19. The method of claim 18, further comprising extracting at least one feature from the calculated change of orientation.

20. A non-transitory computer readable storage medium including instructions that, when executed by a processor included in an apparatus wearable by a user, cause the processor to perform operations comprising:

measuring an acceleration of the user;

measuring a magnetic field associated with the user and calculating of a change of orientation of the user based on the measured magnetic field;

identifying, by the processor, the measured acceleration and the calculated change of orientation of the user as a suspected fall;

categorizing, by the processor, the suspected fall as one of an activity of daily life (ADL), a confirmed fall, and an inconclusive event;

transmitting at least one of the measured acceleration and the calculated change of orientation to a cloud computing system; and receiving a re-confirmation or change of classification from the cloud computing system based on the at least one of the measured acceleration and the change of orientation.

* * * * *

UNITED STATES PATENT AND TRADEMARK OFFICE
CERTIFICATE OF CORRECTION

PATENT NO. : 10,309,980 B2  
APPLICATION NO. : 15/499625  
DATED : June 4, 2019  
INVENTOR(S) : Fish et al.

Page 1 of 1

It is certified that error appears in the above-identified patent and that said Letters Patent is hereby corrected as shown below:

On the Title Page

Item (57), in "Abstract", in Column 2, Line 3, after "measuring", insert --a--

Page 2, Item (56) under "Other Publications", Line 55, delete "2014" and insert --2013-- therefor Signed and Sealed this  
Seventh Day of July, 2020

Andrei Iancu  
*Director of the United States Patent and Trademark Office*